(No Model.) 5 Sheets—Sheet 1.

W. H. KYNETT & I. J. TUTTLE.
CARPET LOOM.

No. 581,075. Patented Apr. 20, 1897.

(No Model.) 5 Sheets—Sheet 2.

W. H. KYNETT & I. J. TUTTLE.
CARPET LOOM.

No. 581,075. Patented Apr. 20, 1897.

(No Model.) 5 Sheets—Sheet 3.
W. H. KYNETT & I. J. TUTTLE.
CARPET LOOM.
No. 581,075. Patented Apr. 20, 1897.
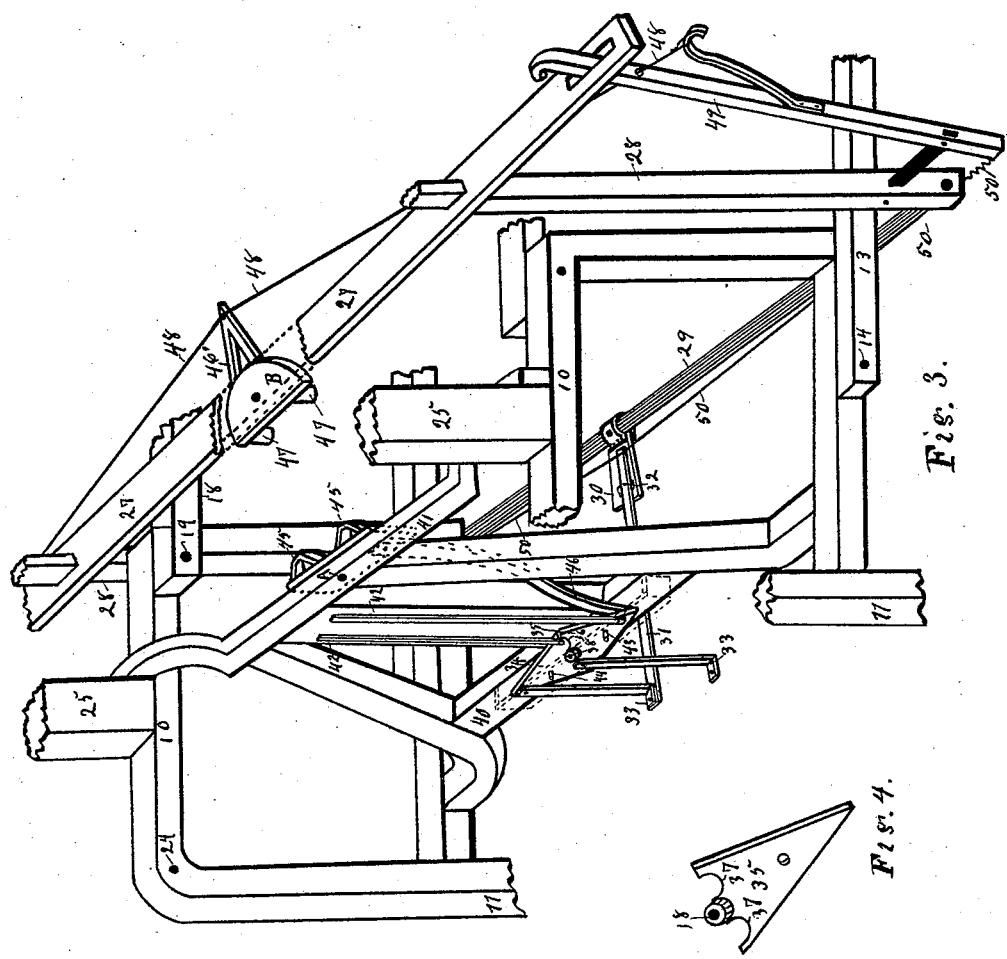
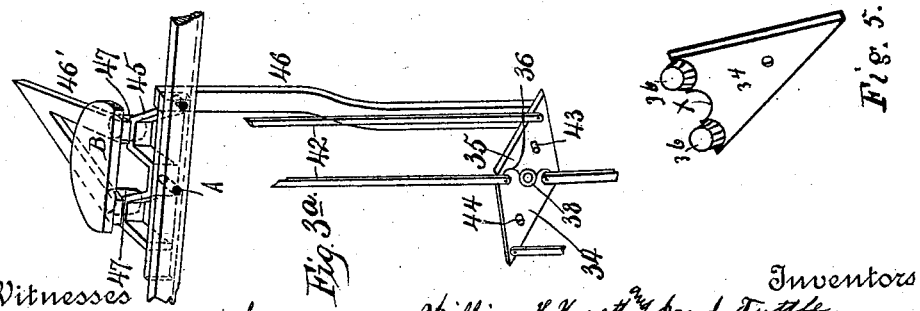

(No Model.) 5 Sheets—Sheet 4.

W. H. KYNETT & I. J. TUTTLE.
CARPET LOOM.

No. 581,075. Patented Apr. 20, 1897.

(No Model.) 5 Sheets—Sheet 5.

W. H. KYNETT & I. J. TUTTLE.
CARPET LOOM.

No. 581,075. Patented Apr. 20, 1897.

UNITED STATES PATENT OFFICE.

WILLIAM H. KYNETT AND IRA J. TUTTLE, OF BATTLE CREEK, MICHIGAN; SAID TUTTLE ASSIGNOR TO SAID KYNETT.

CARPET-LOOM.

SPECIFICATION forming part of Letters Patent No. 581,075, dated April 20, 1897.

Application filed October 19, 1895. Renewed March 20, 1897. Serial No. 628,523. (No model.)

*To all whom it may concern:*

Be it known that we, WILLIAM H. KYNETT and IRA J. TUTTLE, residing at Battle Creek, in the county of Calhoun, State of Michigan, have invented a new and useful Carpet-Loom, of which the following is a specification.

This invention relates to that class of looms which fold up, so as to occupy less space, enabling them to be moved through a narrow passage.

It also relates to looms having picker-sticks pivoted at each end of the batten, a lever centrally pivoted to the batten, cords leading from each end of the pivoted lever to the picker-sticks, a pivoted projection on the cross-beam of the frame and adapted to be adjusted to operate the pivoted lever of the batten during the backward and forward swing of said batten, and cam-plates operatively connected with said projection and with the base rocking shaft of the batten, so that the projection is adjusted by the swing of the batten.

The invention has for its object certain improvements affecting the folding feature of the frame and in location of the cam-plates and the construction and arrangement of parts connecting therewith.

Other objects will appear in the following description and claims.

Figure 1:
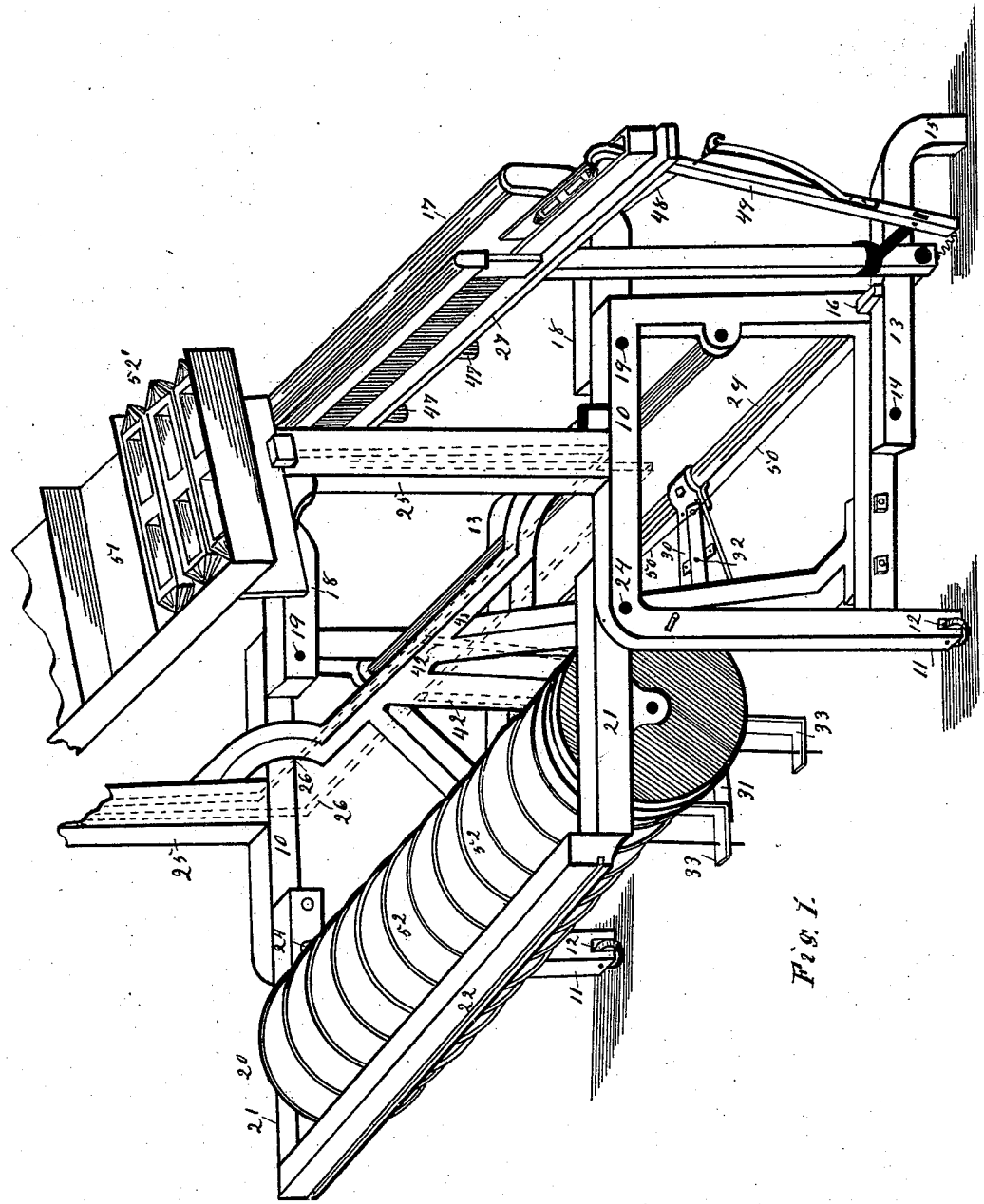
Figure 2:
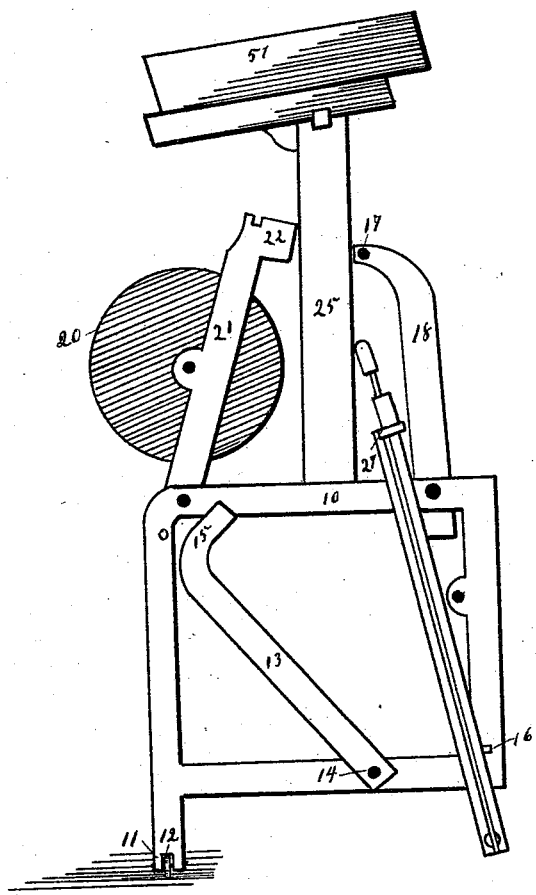
Figure 6:
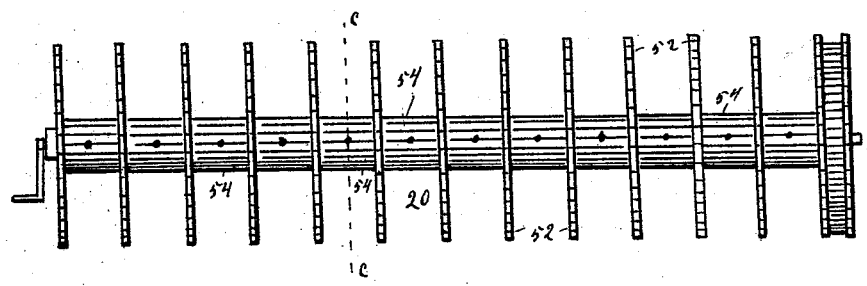
Figure 7:
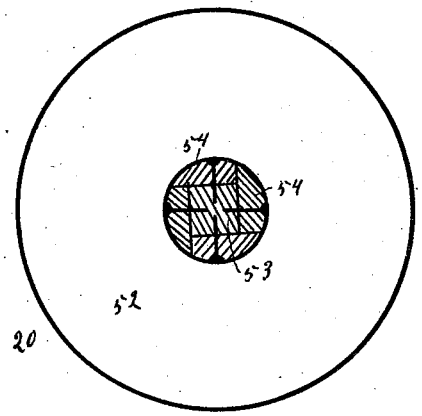
Figure 8:
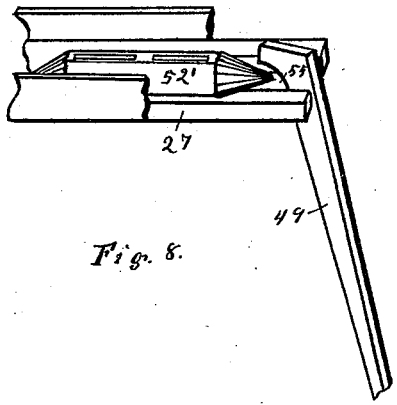
Figure 9:
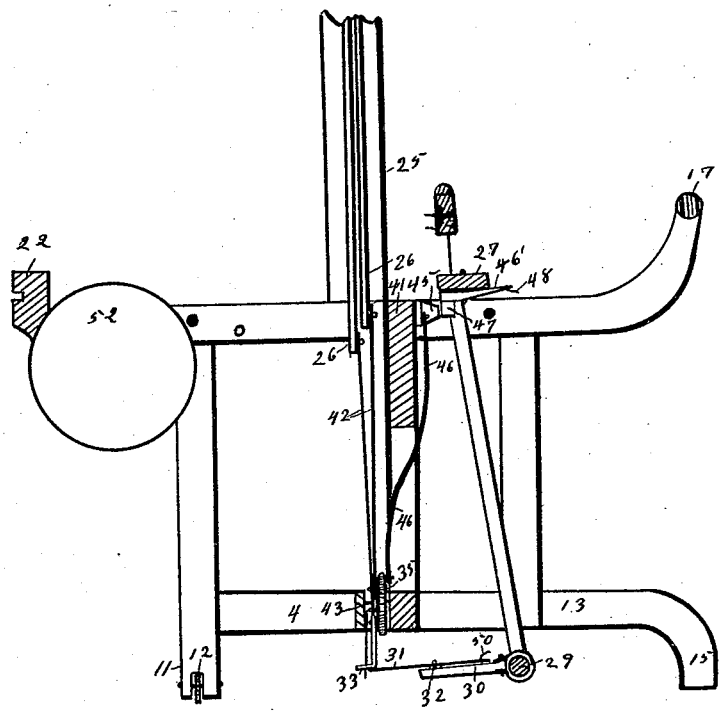

In the drawings forming a part of this specification, Figure 1 is a perspective view of the loom, looking against one of the rear corners; Fig. 2, an end view showing the loom folded. Fig. 3 is similar to Fig. 1, some of the parts being broken away to disclose details of structure. Fig. 3ª is a detail view of certain parts of the structure shown in Fig. 3 detached; Fig. 4, an enlarged perspective of one of the cam-plates in Fig. 3; Fig. 5, an enlarged inverted view of the other cam-plate in Fig. 3; Fig. 6, rear elevation of the warp-beam; Fig. 7, a section of Fig. 6 on line $cc$. Fig. 8 shows broken portions of the batten and picker-stick in perspective, and Fig. 9 is a transverse central section of the loom.

Referring to the parts of the drawings pointed out by numerals, 10 10 are the rectangular frame ends of the loom-frame, the lower corners at 11 being provided with rollers 12. The lower front corner in Fig. 2 is provided with short legs having roller 12. This is not so shown in other figures and is purely a matter of choice. At the lower front corners are base-supports 13, properly forming forward extensions of the frame and consisting of horizontal base-bars pivoted to the rear ends at 14 to the lower bars of the frame ends 10 and projecting downward at the front ends, forming legs 15 for additional support to the front side of the loom. These base-bars are held down by the wedges 16, detachably inserted through holes in the front upright standards of the frame ends 10 and catching over said base-supports 13, Figs. 1 and 2. The forward frame-beam 17 is also arranged to fold up, it being attached at the ends to the side bars 18, which said bars curve up at the front end and are pivoted at 19 to the frame ends 10.

The loom-frame has a rear extension for supporting the warp-beam 20, consisting of the side bars 21, to which the warp-beam is journaled, and a rear bar 22, attached to the rear ends of the side bars 21, the front ends of said bars being pivoted at 24 to the frame ends 10 of the loom-frame.

Fig. 2 shows the loom-frame folded up, the base-support 13 being swung over rearwardly, first having removed the wedges 16, the warp-beam support being swung up forwardly and the front beam 17 being swung upward and rearward against the guide-supports 25 of the harness-frames 26, the latter being shown in dotted lines in Fig. 1.

The batten 27 is attached at each end by standards 28 to the rocking shaft 29 at the base. Fig. 3 shows the batten with parts broken away. Attached to the rocking shaft 29 is a rearwardly-extended laterally-swinging arm 31, the attachment being effected by the pivot at 32, so as to swing from beneath one step 33 to the other. This support 30 swings up and down when the batten 27 swings back and forth and swings the lever 31 with it and thus operating the cam-plates 34 and 35. The steps 33 are pivoted at the upper ends to the cam-plate 34 each side of its pivot 44, Fig. 3. The cam-plates 34 and 35 are pivoted at 43 and 44 to the beam 40 of the frame. One cam-plate 35 has a roller 38, which fits loosely in a curve or cam-surface X of the other cam-plate 34, and said cam-plate 34 is provided with two cam projections 36, which loosely fit in the cam-surfaces 37 of the cam-plate 35 when said cam-plates are placed end to end, as in Fig. 3. To the cam-plate 35 is pivoted the lower end of a bar 46, the other end of said bar being pivotally attached to one end of the plate having the two projections 45, as shown in part by dotted lines in Fig. 3, and also shown in Fig. 3ᵃ. This plate is pivoted at A to the front side of the cross-beam 41 in position for the lugs 47 of the T-headed lever 46 to alternately contact with the projections 45, as explained in the operation. The T-headed lever 46 is pivoted at B to the under side of the batten 27. The batten is centrally broken away in Fig. 3, showing the lever beneath.

To each of the cam-plates 34 and 35 is pivotally attached a bar 42 at the lower end, the upper ends of these bars being broken away in Fig. 3. They are shown by dotted lines in Fig. 1. In use said bars are attached to the harness-frames 26 in the usual manner, as in Fig. 1, where said frames are indicated by dotted lines, so that when the cam-plates are operated by rocking on their cam connections the harness-frames are shifted, as heretofore. These cam-plates 34 and 35 are somewhat like those heretofore used, but in the present instance they are located so as to swing vertically and are connected in a different manner with old parts and with new parts in a manner to operate more satisfactorily. Picker-sticks 49 are pivotally connected at the lower end with the batten-standards 28 and pass up through the batten, as heretofore, Figs. 1 and 3.

Cords 48 connect each picker-stick with the T-headed lever 46', so that when said lever swings laterally it operates the picker-sticks and throws the shuttle across the batten in the ordinary manner. The shuttle is not shown in Fig. 3. Cords 50 connect the lower end of the picker-sticks with the rear end of the swinging lever 31, so that when the picker-stick 49 is operated the lever 31 is shifted from beneath one step 33 to the other. In Fig. 1 guide-rods are shown extending down through the steps. As this is not new in this application, we have not shown it in Fig. 3, and in said figure we have shown the frame where it comes in front of the cam-plates (which portion of the frame supports the front ends of the pivots 43 and 44) in dotted lines, so as not to hide the cam-plates from view. By this construction and arrangement we simplify parts, improve the leverage, and are enabled to make the rods 42 straight and use more desirable means for operating the lever 46'. By referring to Fig. 9 the relation of the step 33 with the pivoted lever 31 will be seen; also, how the projection 47 of the T-headed lever 46' comes in contact with the projections 45, pivoted to the side of the beam 41, when the batten is swung toward the harness 26; also, how the bars 42 are pivotally attached to the harness 26.

In the operation the batten 27 in Figs. 1 and 3 is supposed to be swinging forward to close the woof. This action tilts the bar 30, causing the swinging lever 31 to rise on the left-hand step 33, thus tilting the cam-plates 34 and 35, so as to throw their outer ends upward. This action shifts the harness-frames 26 and tilts the double projection 45, so that when the batten 27 swings back the right-hand projection in Fig. 3 will come in contact with the right-hand stud 47 of the lever 46, tilting said lever and operating the right-hand picker-stick 49 in Figs. 1 and 3. So the operation continues as the batten is swung backward and forward.

On top of the guide-supports 25 we prefer to place a tray 51, having different compartments for holding the shuttles 52' in a convenient place and manner. The warp-beam 20 is divided off in the usual manner for holding warp of different colors by a series of separated disks 52. The beam is angular in cross-section, and the disks are separated by a series of blocks 54, firmly attached to the beam by placing one on each side, as in Fig. 7, so that the side of one overlaps the edges of the next one, and nailing or screwing them fast to the beam and then rounding the outer corners, so as to make the beam round in cross-section. This is a more convenient manner of making the separating-blocks than by having them all of one piece.

The upper end of the picker-sticks 49, Fig. 8, are hollowed, as at 55, so that the picker-stick will strike upon and against the end of the shuttle gradually, first upon the upper side of the end, instead of only abruptly against the blunt end, which causes the shuttle to fly off from the batten 27, since the end stroke alone throws the shuttle up.

Having thus described our invention, what we claim as new, and desire to secure by Letters Patent of the United States, is—

1. A folding loom-frame, comprising the rectangular frame ends, the base-supports having the downward projections at the ends forming legs, the rear ends being pivoted to the lower part of the frame ends, the forward beam having end bars pivoted to the upper part of the frame ends, and the warp-beam support having its end bars pivoted to the upper part of the frame ends, substantially as set forth.

2. A folding loom-frame, comprising the frame ends, base-supports having the downwardly-extending ends, and being pivoted to the frame ends, the forward beam pivoted to the frame ends so as to fold over, and a warp-beam support pivoted to the frame ends so as to fold over, substantially as set forth.

3. The combination of the picker-sticks, batten, the T-headed lever provided with the studs and pivoted to the batten, cords attached to the lever and picker-sticks, the double projection pivoted to the front side of the cross-beam of the frame, cam-plates arranged to swing vertically the rod pivotally attached to one of said cam-plates and to the double projection, the steps pivotally attached to one of the cam-plates, the rocking shaft of the batten, and the lever which catches under the steps, substantially as set forth.

In testimony of the foregoing we have hereunto set our hands in the presence of two witnesses.

WILLIAM H. KYNETT.
IRA J. TUTTLE.

Witnesses:
J. S. CROWTHER,
M. RANDALL.